Fig. I

Paul A. Huska
Herman P. Meissner
INVENTORS

Paul A. Huska
Herman P. Meissner
INVENTORS

United States Patent Office 3,816,590
Patented June 11, 1974

3,816,590
METHOD AND APPARATUS FOR PROVIDING A PURE CONCENTRATED AQUEOUS SOLUTION OF ALUMINUM NITRATE
Paul A. Huska, Carlisle, and Herman P. Meissner, Winchester, Mass., assignors to Arthur D. Little, Inc., Cambridge, Mass.
Filed Mar. 18, 1971, Ser. No. 125,757
Int. Cl. C01b 7/30, 7/36
U.S. Cl. 423—112
12 Claims

ABSTRACT OF THE DISCLOSURE

Method and apparatus for providing a concentrated aqueous aluminum nitrate solution as a feed liquid for hydrolysis in a fluidized bed. An aqueous solution of aluminum nitrate containing iron and other dissolved impurities is first contacted with an organic ion-exchange liquid to remove the iron and then pure aluminum nitrate nonahydrate is crystallized from the iron-free solution to remove the other impurities. Crystallization is carried out in a manner to prevent formation of basic aluminum nitrate. The pure aluminum nitrate nonahydrate crystals are heated to dissolve the aluminum salt in its water of hydration. The resulting 56.7% solution is used as feed in a fluidized bed to produce alumina of a purity which permits its direct reduction to aluminum metal.

This invention relates to method and apparatus for extracting alumina from aluminum-bearing clays, and more particularly to the production of an aqueous aluminum nitrate solution suitable for hydrolysis to form alumina of sufficient purity to be electrolyzed to aluminum metal.

In a copending application Ser. No. 768,112 (now U.S. Pat. 3,586,481) filed Oct. 16, 1968, in the names of Richard W. Hyde and Stanley V. Margolin and assigned to the same assignee as the present application, there is disclosed an overall economical process for extracting alumina from aluminum-bearing clays. In brief, the method described in this copending application comprises the following steps carried out under specified conditions:

calcining clay to break the alumino-silicate bonds such that the resulting aluminum portions are soluble in nitric acid;
leaching the calcined clay with nitric acid to dissolve the aluminum;
separating to remove all of the suspended solids from the impure aqueous aluminum nitrate leach liquor;
purifying the aqueous aluminum nitrate leach liquor by contacting it with an ion-exchange liquid to remove ferric ions and other dissolved impurities;
hydrolyzing the resulting essentially iron-free aqueous aluminum nitrate solution in a fluidized bed maintained under conditions controlled to remove substantially all of the nitrate values as nitric acid; and
heating to remove any residual nitrate values and convert the alumina to the alpha alumina form.

In purifying the aqueous aluminum nitrate leach liquor it is necessary to remove substantially all of the dissolved impurities which may include any combination of iron, calcium, magnesium, phosphorus, titanium, vanadium, chromium, nickel and lead. At the same time it is, of course, necessary to retain a maximum amount of the aluminum in solution. Inasmuch as the quantity of iron, in the form of ferric nitrate, normally forms the major portion of these impurities, the purification of the aluminum nitrate leach liquor is directed primarily to the removal of the iron and the removal of other impurities along with the iron has been considered a benefit arising from but not the primary object of the purification step.

In this process a preferred ion-exhange liquid is di(2-ethylhexyl) hydrogen phosphate containing a small synergistic amount of tributyl phosphate or a high molecular weight, oil-soluble water-insoluble primary amine in free base form. (This ion-exchange liquid is the subject of application Ser. No. 768,180, filed Oct. 16, 1968 in the name of Harold William Flood and assigned to the same assignee, now U.S. Pat. 3,586,477.) In using this ion-exchange liquid it has been found that as it becomes more and more loaded with iron other complexed impurity ions are replaced by iron because of the much greater affinity of the ion-exchange liquid for iron than for the other impurities. To ensure the removal of metallic impurities other than iron it has been found desirable to use a quantity of the ion-exchange liquid calculated to be about twice the amount required for the iron removal. This in turn results in doubling the contacting equipment (extractors and settling tanks) as well as the amount of ion-exchange liquid.

Moreover, although the di(2-ethylhexyl) hydrogen phosphate, with or without tributyl phosphate, has been found effective in removing several of the impurities other than iron, it is anticipated that aluminum-bearing clays may be used which contain impurities which di(2-ethylhexyl) hydrogen phosphate with tributylphosphate, or the ion-exchange liquids described in U.S. Pat. 3,211,521, cannot extract down to a desired level. It is also possible that in some clays, the levels of certain impurities may increase above that where their removal by an ion-exchange liquid alone is uneconomical.

In the process of the above-identified U.S. Ser. No. 768,112 hydrolysis of the purified aqueous aluminum nitrate solution is accomplished in a fluidized bed. (See also U.S. Ser. No. 768,111, filed Oct. 16, 1968 in the names of Paul A. Huska, Herman P. Meissner and Thomas J. Lamb, now U.S. Pat. 3,647,373, and Ser. No. 125,758, filed Mar. 18, 1971, in the names of August H. Schutte and James I. Stevens, both of which are assigned to the same assignee as the present application.) It is, of course, desirable from an economical point of view to introduce the aqueous aluminum nitrate solution into the fluidized bed in the most highly concentrated form that is feasible to minimize fuel costs. Since aluminum nitrate crystallizes out as the nonahydrate, the most desirable feed solution is aluminate nitrate dissolved in its water of hydration, i.e., a concentration of 56.7% aluminum nitrate. However, an aluminum nitrate solution of this concentration may cause rapid deterioration of some types of ion-exchange liquids; and it is therefore desirable to use solutions of lesser concentrations in the step of impurity removal which includes contacting it with an ion-exchange liquid. This indicates that concentration between the liquid contacting step and the hydrolysis step is desirable, at least in some instances. Merely to concentrate the essentially iron-free aqueous aluminum nitrate solution without regard for the conditions under which the concentration is carried out would result in the formation of basic aluminum nitrate, the presence of which is to be avoided as detailed below. It is therefore necessary to cary out crystallization of the aluminum nitrate nonahydrate without formation of the basic aluminum nitrate and to make this crystallization an integral part of the process for producing alpha-alumina from clays.

It is therefore a primary object of this invention to provide an improved method for producing an essentially impurity-free aqueous aluminum nitrate solution which can be hydrolyzed to form alpha-alumina of sufficient purity to permit its reduction to aluminum metal. Another object of this invention to provide a method of the character described for producing a concentrated aluminum nitrate solution which can be readily integrated into an overall process for producing alpha-alumina from clay.

It is another primary object of this invention to provide improved apparatus for producing an essentially impurity-free aqueous aluminum nitrate solution and for producing alpha-alumina from clay, the alumina being of a purity which permits its reduction to aluminum metal. Other objects of the invention will in part be obvious and will in part be apparent hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

In accordance with this invention, aluminum nitrate nonahydrate is crystallized from an essentially iron-free aqueous solution of aluminum nitrate under conditions which maintain the molecular ratio of $NO_3^-$ to $Al^{+3}$ at essentially 3 to 1. The crystallized nonahydrate, separted by filtration, is then heated to form a solution in the water of hydration and used as feed in the fluidized bed system used for hydrolysis to form alumina, nitric acid and water. The filtrate is recycled for use in leaching the calcined clay. The product nitric acid from the hydrolysis step may be used in the crystallizing step to adjust the nitrate/aluminum ratio in a manner to prevent formation of basic aluminum nitrate.

For a fuller understanding of the nature and objects of the invention, reference should be had to the following detailed description taken in connection with the accompanying drawings in which FIG. 1 is a schematic flow diagram of one embodiment of this invention wherein cooling of the solution alone is employed to maintain the desired molecular ratio of $NO_3^-$ to $Al^{+3}$;

Figure 1:
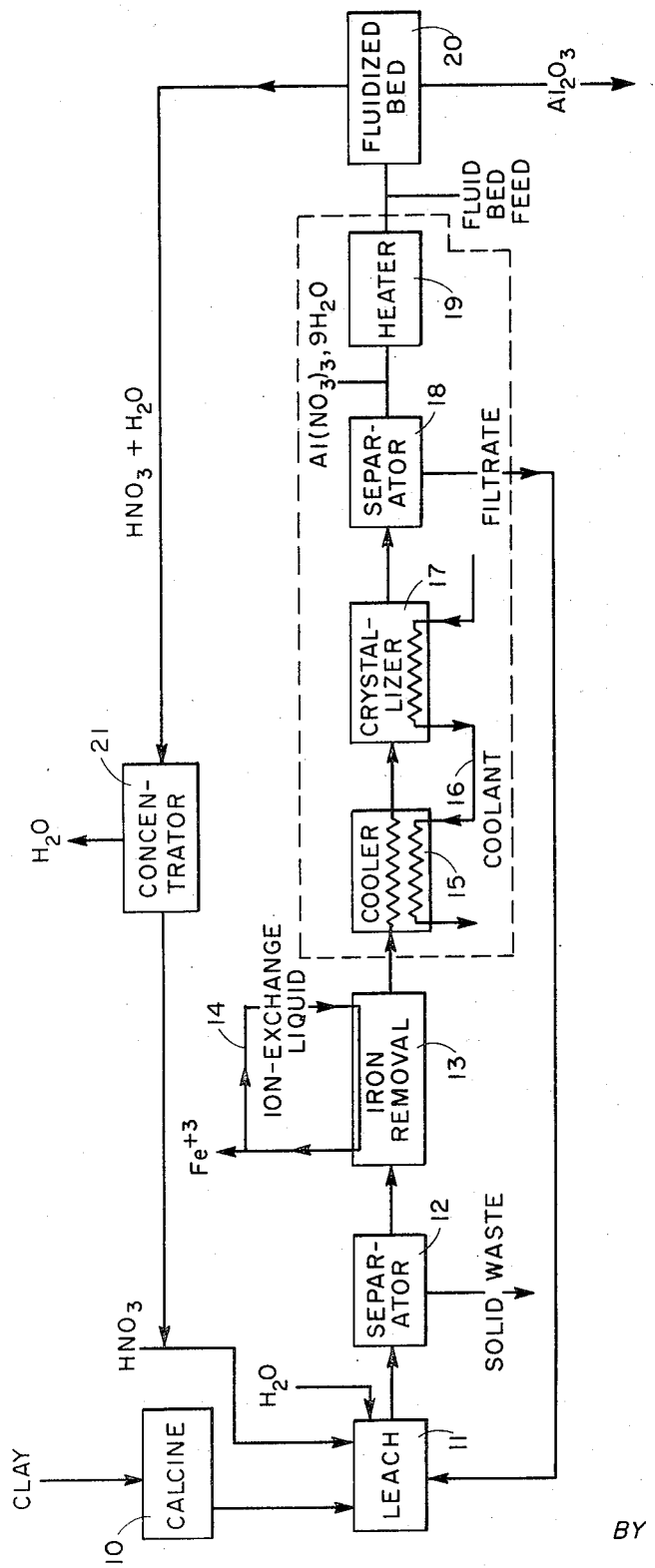

It was pointed out above that the crystallization of aluminum nitrate without regards to the conditions under which the crystallization is carried out gives rise to the production of basic aluminum nitrate, a compound which may be generally represented as $Al(OH)_x \cdot (NO_3)_y \cdot nH_2O$ wherein $x+y=3$. If an aqueous solution of aluminum nitrate, such as that which results after removal of iron by contacting with an ion-exchange liquid, is heated to concentrate it, nitric acid is removed as vapor, and the ratio of $NO_3^-$ to $Al^{+3}$ in the solution decreases. When the ratio drops significantly below three basic aluminum nitrate forms. The basic aluminum nitrate thus formed precipitates out as a very fine crystalline material which approaches colloidal dimensions. This material is temperature sensitive, sticks readily to heated surfaces decomposing to the oxides of nitrogen rather than to nitric acid, and because of its very high surface area it tends to entrap impurities. Thus the presence of any appreciable quantities of basic aluminum nitrate in a nitric acid system operated as a batch process for extracting alumina from aluminum-bearing clays must be avoided. In a continuous process of this type, formation of any basic aluminum nitrate must be essentially eliminated.

FIGS. 1–4 illustrate four different embodiments of this invention showing different ways by which crystallization of the essentially iron-free aqueous aluminum nitrate solution is attained without the formation of basic aluminum nitrate.

In accordance with the teaching in the above-identified Ser. No. 768,112, now U.S. Pat. 3,586,481, aluminum-bearing clays are processed as shown in that portion of FIG. 1 lying outside the dotted lines. The clay is calcined 10 to break the alumino-silicate bonds in a manner to make the aluminum portions soluble in nitric acid. (The steps and/or apparatus are given reference numerals in the drawings for ease of identification.) The calcined material is leached 11 at a temperature between about 100 and 145° C. using an essentially stoichiometric amount of 35 to 55 weight percent of nitric acid and for a sufficient time to reduce the silica in solution to a minimum. The solid waste material is then separated in separator 12 from the leach liquor, preferably with the use of an added flocculant. Iron is removed from the leach liquor by contacting it with an ion-exchange liquid 13 such as described in U.S. Pat. 3,211,521 or in the above-identified Ser. No. 768,180, now U.S. Pat. 3,586,477. The ion-exchange liquid is recirculated 14, and is preferably treated for recirculation by the method described in a copending application, Ser. No. 768,033 (now U.S. Pat. 3,586,476) filed in the names of Heinz P. Beutner and Paul A. Huska and assigned to the same assignee as the present invention.

In accordance with the teaching of Ser. No. 768,112, the contacting 13 of the leach liquor with the impure aqueous aluminum nitrate solution is preferably carried out at about 60° C., while maintaining the concentration of the aluminum salt no greater than about 55% (and more usually at about 50%) by weight to prevent any thermal degradation of the ion-exchange liquid at this temperature. As noted previously, the affinity of the ion-exchange liquid, which makes up an organic phase, is very great for ferric ions. This means that if the amount of ion-exchange liquid used is limited to just that calculated as being necessary to complex all of the iron plus selected other impurities, a large amount of the nonferric impurities will be returned to the aqueous phase as more and more iron is made available for complexing. Therefore, in order to complex at least some of the nonferric impurities and transfer them to the organic phase it is necessary to use the ion-exchange liquid in relatively large excess over the amount theoretically required.

In the practice of this invention, the amount of this excess ion-exchange liquid may be reduced by employing crystallization to remove from the aluminum nitrate those impurities which may be complexed and returned to the aqueous phase as well as other impurities which may not be complexed in the ion-exchange liquid.

Figure 5:
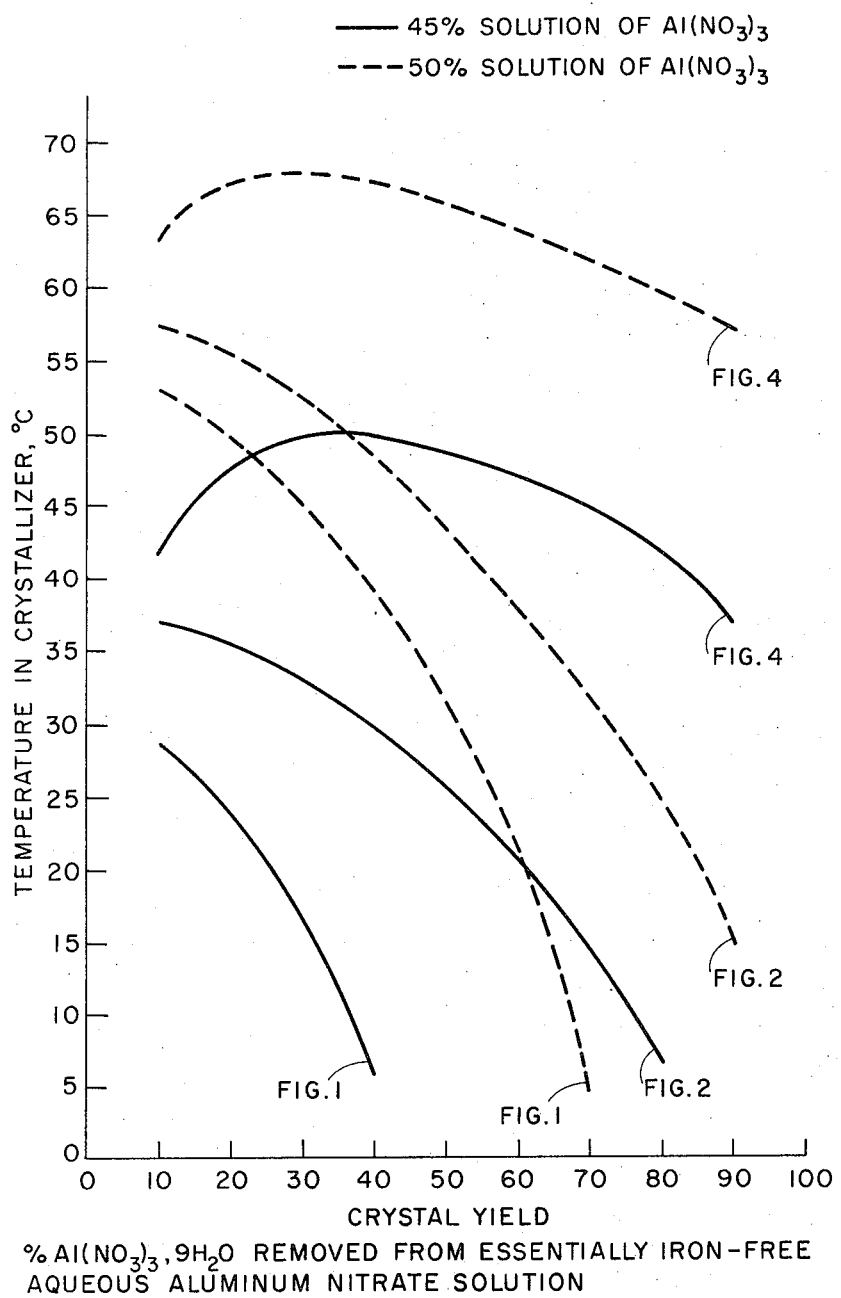
FIG. 5 is a plot of crystal yield as a function of temperature for the three embodiments illustrated in FIGS. 1, 3 and 4.

If crystallization is to be accomplished solely by cooling, then this may be accomplished in a cooler 15 as shown in FIG. 1 using an externally-supplied coolant 16, such as water, circulated to effect indirect heat-exchange with the aqueous aluminum nitrate solution prior to its introduction into and while remaining in crystallizer 17. FIG. 5 shows (solid line labeled "Fig. 1") that if cooling alone is used to form crystals from a 45% by weight solution it is necessary to cool the aqueous aluminum nitrate from about 60° C. (the temperature at which the step of contacting with an ion-exchange liquid is preferably carried out) down to about 15° C. to obtain a 30% crystal yield and down to about 7° C. to obtain a 40% crystal yield. If the solution entering cooler 15 is 50% by weight aluminum nitrate (dotted line labeled "Fig. 1" in FIG. 5) then it must be cooled to about 45° C. to obtain a 30% crystal yield and to about 32° C. to obtain a 50° C. crystal yield. Cooling alone is a relatively simple way of crystallizing the aluminum nitrate nonahydrate without shafting the balance of nitrate $NO_3^-$ to aluminum $Al^{+3}$; but it will be seen that it requires a large amount of coolant to be circulated.

The crystals of aluminum nitrate nonahydrate thus formed are separated from the mother liquor in any suitable separator 18 such as a filtering unit or centrifuge. Since the nine moles of water of hydration are to form the solvent for the aluminum nitrate used as a solution feed for the fluidized bed, it is necessary to heat the aluminum nitrate nonahydrate to about 80° C. in a heater 19 prior to its injection into the fluidized bed 20. This feed solution is 56.7% aluminum nitrate, the most concentrated solution readily attainable. It can be shown that the use of this concentration of feed solution reduces the amount of water which must be evaporated in and removed from the fluidized bed by 57.4% from that required to be removed if a 45% concentration feed solution is used and by 23.4% from that required to be removed if a 50% concentration feed solution is used. Thus by crystallizing the aluminum nitrate nonahydrate it is possible to materially reduce the heat load in the fluidized bed used for the hydrolysis step, as well as to reduce the amount of ion-exchange liquid required along with the equipment required to use it. Finally, it is possible to work with lower aluminum nitrate concentrations in the iron removal step to protect the ion-exchange liquid while at the same time using the highest feasible salt concentration as the fluidized bed feed.

The filtrate, or mother liquor, which remains after crystal separation is returned to the leaching tanks 11 and the amounts of water and nitric acid added are correspondingly adjusted to provide the desired amount of nitric acid in the desired concentration to the leaching step. In this embodiment the effluent nitric acid and water from the fluidized bed 20 is concentrated in a concentrator 21 and recycled.

In place of the cooler and the externally supplied coolant, a vacuum crystallizer system may be used to effect crystallization through a combination of cooling and water removal. Such a vacuum crystallizer system is detailed in FIG. 2. The aqueous aluminum nitrate solution from which the iron has been stripped is delivered to a mixing tank 30 to be mixed with impure aluminum nitrate nonahydrate crystals, the source of which will be subsequently explained. The mixture is then transferred to a solution surge tank 31 from where the aqueous salt solution is taken to a vacuum crystallizer 32, which may, of course, be made up of any desired number of units. In keeping with known vacuum crystallizer designs, the vacuum is created by use of a steam ejector 33. A portion of the water making up the aluminum nitrate solution is withdrawn. However, since evaporation within the vacuum crystallizer results in the cooling of the liquid during crystallization, no appreciable amount of nitric acid vapor is removed and the desired nitrate/aluminum ratio is maintained. A small amount of nitrate values may be lost in the water from the steam ejector 33 and the discharge from the ejector may be used as process water for adding to the leaching of the clay. This very small quantity of nitrate values may be returned to the crystallizing system by introducing nitric acid into the mixing tank 30 through valve-controlled line 34.

A slurry of the crystals thus formed is withdrawn from the bottom of crystallizer 32 and transferred to a centrifuge 35 where the crystals are washed with cold wash water and separated from the filtrate. The pure aluminum nitrate nonahydrate crystals are then delivered to heater 19 for melting as explained in conjunction with the description of FIG. 1.

A portion of the wash liquor from centrifuge 35, along with liquid drained from the slurry in crystallizer 32, is returned to the solution feed line of crystallizer 32. The remainder of the wash liquor is used to make up the feed liquid for an auxiliary vacuum crystallizer 36. Inasmuch as water is removed through the steam ejector 33 and in the pure crystals as water of hydration, the addition of water to the system to wash the crystals does not create an imbalance in the system and permits the recycling of the liquids as described.

Figure 2:
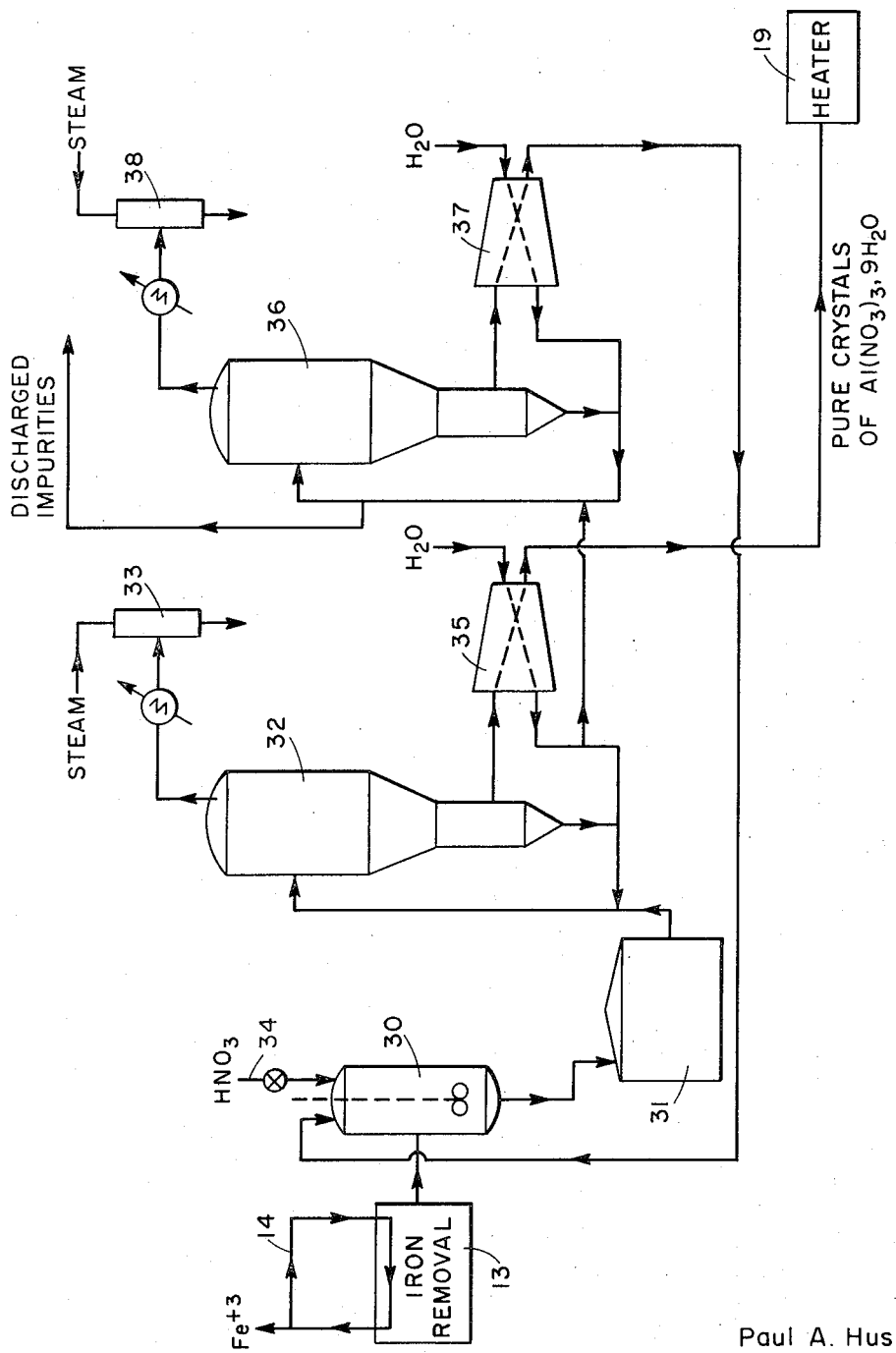
FIG. 2 is a schematic drawing showing apparatus and cyclic liquid flow for a crystallization step using vacuum crystallizers to effect cooling and to control the water content in the system.

The wash liquor from centrifuge 35 contains the impurities to be removed in relatively concentrated form. However, it also contains aluminum values and hence it is preferable to recover most of the aluminum values by crystallizing somewhat impure aluminum nitrate nonahydrate crystals in the auxiliary vacuum crystallizer 36. As seen in FIG. 2, a portion of this wash liquor containing relatively concentrated impurities may be discarded. The impure crystals, in a slurry, are transferred from auxiliary crystallizer 36 to a centrifuge 37 and there washed with cold water, separated, and returned to mixing tank 30. The wash liquor from centrifuge 37, along with liquid drained from the slurry in crystallizer 36, is returned to the liquid feed line of auxiliary crystallizer 36. The amount of wash water directed into centrifuge 37 is also controlled by the amount of water removed through steam injector 38 and as water of hydration in the impure crystals circulated to mixing tank 30.

Since crystallization in the vacuum crystallizer system of FIG. 2 is attained primarily through cooling, the "Fig. 1" curves of FIG. 5 are applicable to the apparatus detailed in FIG. 2.

Figure 3:
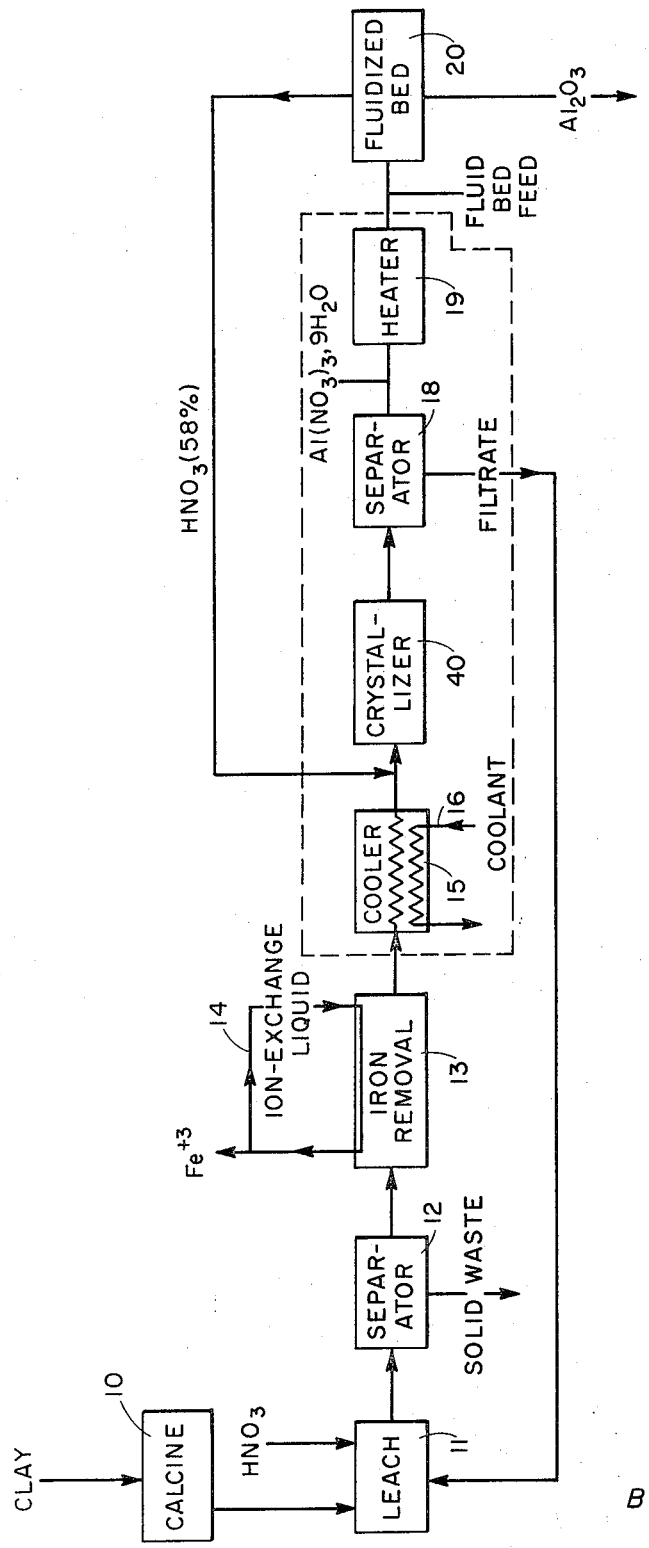
FIG. 3 is a schematic flow diagram of a second embodiment of this invention wherein cooling of the solution and addition of aqueous nitric acid to the crystallizer are used to maintain the desired molecular ratio of $NO_3^-$ to $Al^{+3}$.

In the embodiment shown in FIG. 3, in which like reference numerals refer to like components in FIG. 1, the essentially iron-free aqueous aluminum nitrate is cooled by indirect heat exchange with a coolant and transferred into a crystallizer 40 which may take the form of a settling tank. The use of cooling to effect crystallization is augmented by the addition of the nitric acid/water effluent from the fluid bed. The addition of nitric acid serves to salt out the aluminum nitrate nonahydrate and ensures a sufficient supply of $NO_3^-$ ions to prevent the formation of any basic aluminum nitrate. The nitric acid/water effluent may be concentrated if desired. In the plot of FIG. 5 it was assumed that cooling is combined with the addition of 58% nitric acid to obtain the curves labelled "Fig. 3," i.e., the embodiment illustrated in FIG. 3. Again it is assumed as in the "Fig. 1" curves that the concentrations of the solution entering the cooler in FIG. 3 are 45% (solid line) and 50% (dotted line). It will be seen that the cooling requirements are materially less when the effluent nitric acid/water is added to the crystallizer, for to obtain 30% crystallization requires cooling to about 32° C. (compared to about 15° C. for cooling only) and to obtain 50% crystallization requires cooling to about 25° C. if the aluminum nitrate solution entering the cooler is 45%. If this concentration is raised to 50%, then cooling need be only to about 52° C. to obtain 30% crystallization and to about 46° C. to obtain a 50% crystal yield.

It will, of course, be appreciated that the temperature of the condensed nitric acid/water effluent entering the stream of cooled aluminum nitrate solution must be taken into consideration in determining the amount of coolant required. Thus the condensed effluent may serve to reduce the stream temperature or it may increase it depending upon whether or not it is conveyed directly from the fluidized bed.

In the embodiment of FIG. 3, all of the nitric acid/water effluent (minus any water which may be removed in the concentrator) is cycled through the crystallizer and becomes part of the filtrate introduced into the leaching tank 11. Again, the amount of nitric acid and water introduced into the leaching step from external sources is adjusted to meet the desired leaching conditions.

Figure 4:
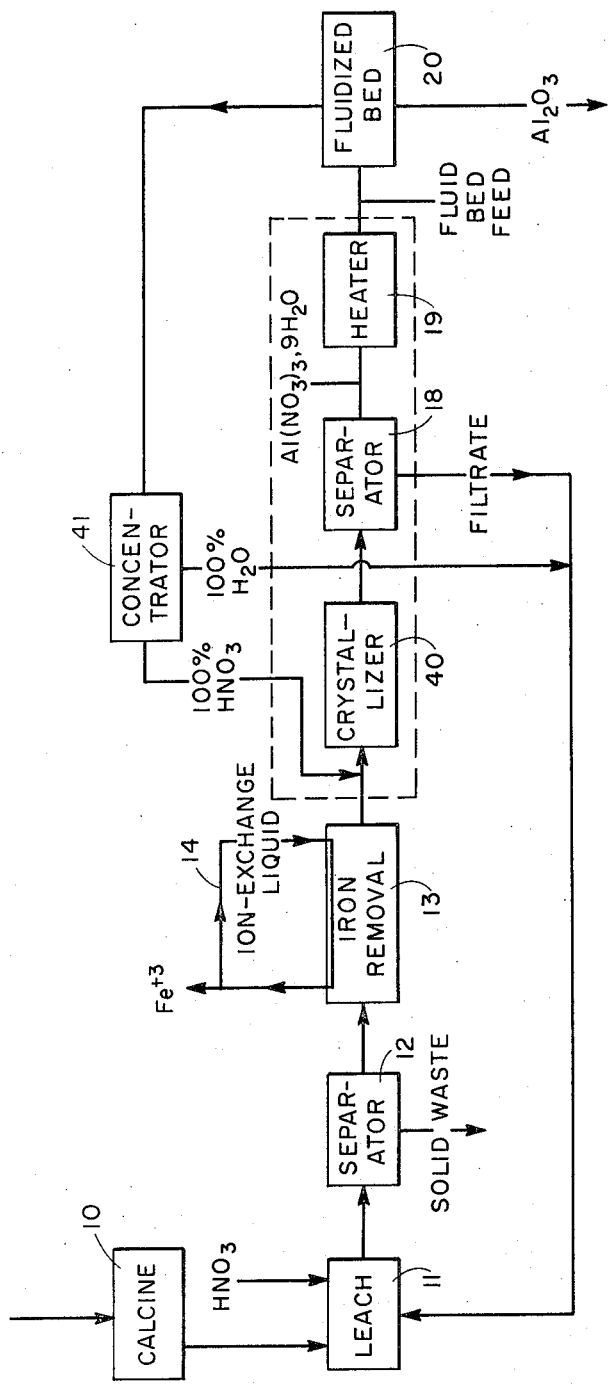
FIG. 4 is a schematic flow diagram of a third embodiment of this invention wherein the addition of concentrated aqueous or 100% nitric acid to the crystallizer is used to maintain the desired molecular ratio of $NO_3^-$ to $Al^{+3}$.

In the embodiment of FIG. 4, the fluidized bed effluent is concentrated in concentrator 41 to provide essentially 100% nitric acid to the crystallizer to maintain a sufficient $NO_3^-$ concentration in the crystallizer to prevent formation of basic aluminum nitrate. The water from the concentrator is sent directly back to the leaching tanks along with the filtrate from the separator.

The use of 100% nitric acid serves to reduce the solubility of aluminum nitrate nonahydrate in its aqueous phase to an extent that little if any cooling is required. Turning to FIG. 5 it will be seen that if a 45% aluminum nitrate solution (solid line) is delivered to the crystallizer from the ion-exchange step, cooling to about 48° C. will result in 50% crystallization. If the aluminum nitrate solution is 50% (dotted line), no cooling is required.

In choosing the operational parameters, e.g., amount of cooling, percent of crystallization attained, and concentration of nitric acid if it is used, it is necessary to consider the amount of liquid which must be recycled. This is best expressed as a liquid recycle ratio which is defined as the ratio of the amount of liquid returned from the separator 18 to the leach tanks 11 to the amount of liquid (aluminum nitrate dissolved in its water of hydration) making up the feed stream into the fluidized bed 20. It is preferable that this ratio does not exceed 5. To realize this liquid feed ratio of 5 the amount of crystallization may be as little as 18 to 20% for the case of FIG. 1, it must be between about 20 and 25% for the cases of FIGS. 3 and 4. It is, of course, preferable to maintain this liquid feed ratio as small as possible commensurate with the ability of the equipment used to handle the crystals. Thus, a liquid feed ratio of about 2 is preferable and a crystal yield of around 50% is desirable from a practical processing point of view.

By integrating a crystallization step into the process described, by properly controlling the operational parameter at which crystallization is carried out and by recycling the liquids in the manner described, it is possible to realize a number of important advantages. It is possible to fully load the ion-exchange liquid with iron thus materially reducing the amount of ion-exchange liquid required and the size of the equipment required for the contacting step as well as of the equipment required to strip the ion-exchange liquid of iron and render it suitable for recycling. It is also possible to use the ion-exchange liquid under conditions which minimize its degradation, e.g., optimum salt concentrations and temperature of the solution to be contacted. Crystallization provides a means for removing impurities which can not be removed by the ion-exchange liquid as well as those impurities which would be removed if a large excess of the ion-exchange liquid were used. Finally, while realizing all of the above-listed advantages, crystallization makes it possible to provide the most concentrated feed solution possible to the fluidized bed which in turn materially decreases the energy requirement for the hydrolysis step by decreasing the amount of water which must be vaporized in this step.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:
1. In a method of recovering alumina from aluminum-bearing clay and including the steps of leaching calcined clay with nitric acid, isolating a strongly acidic aqueous aluminum nitrate solution containing dissolved impurities including iron, removing said impurities to form an essentially impurity-free aluminum nitrate solution, and decomposing under high partial pressures of water the resulting aluminum nitrate in a fluidized bed to form alumina and by-product nitric acid/water effluent, the improvement comprising the steps of
  (a) removing essentially all of said dissolved iron by contacting said aluminum nitrate solution with an organic ion-exchange liquid to form an essentially iron-free aqueous aluminum nitrate solution, and then subsequently removing the remaining dissolved impurities by
  (b) crystallizing up to about 50% of the aluminum nitrate in said essentially iron-free aluminum nitrate solution as pure aluminum nitrate nonahydrate;
  (c) during said crystallizing, maintaining the molecular ratio of nitrate to aluminum at at least three whereby essentially no basic aluminum nitrate is formed;
  (d) separating the aluminum nitrate nonahydrate crystals formed in step (b) from the crystallizing liquor;
  (e) heating said aluminum nitrate nonahydrate crystals thereby to form a concentrated aqueous solution of pure aluminum nitrate in its water of hydration as a feed solution for introduction into said fluidized bed to form said alumina and said by-product nitric acid/water effluent; and
  (f) recycling said crystallizing liquid to said leaching step to provide a portion of the nitric acid required in leaching, the ratio of the volume of said crystallizing liquor thus recycled to the volume of said concentrated aqueous solution of pure aluminum nitrate being no greater than about five.

2. A method in accordance with claim 1 wherein said crystallizing pure aluminum nitrate nonahydrate comprises cooling said essentially iron-free aqueous aluminum nitrate solution.

3. A method in accordance with claim 2 wherein said essentially iron-free aqueous aluminum nitrate solution has a concentration between about 45 and 50% by weight and is cooled to a temperature to attain a crystal yield of greater than 15%.

4. A method in accordance with claim 2 wherein said cooling comprises circulating an externally supplied coolant in indirect heat exchange with said essentially iron-free aqueous aluminum nitrate solution.

5. A method in accordance with claim 2 wherein said cooling comprises removing water vapor under reduced pressure from said essentially iron-free aqueous aluminum nitrate solution.

6. A method in accordance with claim 1 wherein said crystallizing pure aluminum nitrate nonahydrate comprises
  (1) removing water vapor under reduced pressure from said essentially iron-free aqueous aluminum nitrate solution, thereby to form a crystal slurry;
  (2) isolating pure aluminum nitrate nonahydrate crystals from said slurry;
  (3) washing said pure crystals with water;
  (4) returning a first portion of the wash water from step (3) to the feed solution of step (1);
  (5) subjecting a second portion of the wash water from step (3) to reduced pressure thereby to remove water vapor and crystallize impure aluminum nitrate nonahydrate; and
  (6) returning said impure aluminum nitrate crystals from step (5) to the feed solution to step (1).

7. A method in accordance with claim 1 wherein said crystallizing comprises adding at least a portion of said by-product nitric acid/water effluent from said fluidized bed to said essentially iron-free aqueous aluminum nitrate solution.

8. A method in accordance with claim 7 including the step of cooling said solution.

9. A method in accordance with claim 8 wherein said essentially iron-free aqueous aluminum nitrate solution has a concentration between about 45 and 50% by weight and is cooled to a temperature to attain a crystal yield between about 30 and 50%.

10. A method in accordance with claim 7 including the step of concentrating the nitric acid in said by-product effluent thereby removing at least a portion of said water.

11. A method in accordance with claim 10 wherein said nitric acid is concentrated to substantially 100%

HNO$_3$ and all of said water removed is recycled directly, along with said crystallizing liquor, to said leaching step.

12. A method in accordance with claim 1 wherein between about 15 and 50% of the aluminum nitrate in said essentially iron-free aqueous aluminum nitrate solution is crystallized as the pure nonahydrate.

References Cited

UNITED STATES PATENTS

| | | |
|---|---|---|
| 1,792,410 | 2/1931 | Buchner _____ 423—125 X |
| 3,383,166 | 5/1968 | Gerry et al. _____ 423—125 X |
| 3,387,921 | 6/1968 | Amano et al. _____ 423—125 X |
| 2,376,696 | 5/1945 | Hixson et al. _____ 23—143 |
| 3,366,446 | 1/1968 | Kelly et al. _____ 23—143 |
| 3,586,481 | 5/1971 | Hyde et al. _____ 23—141 |

MILTON WEISSMAN, Primary Examiner

U.S. Cl. X.R.

423—125, 626, 631